(12) United States Patent
Hollan et al.

(10) Patent No.: US 10,519,746 B2
(45) Date of Patent: Dec. 31, 2019

(54) ACTUATABLE SEAT VALVE AND ACTUATORS FOR USE THEREWITH

(71) Applicant: Integrity Well Completions Inc., Cochrane (CA)

(72) Inventors: Jeremy Charles Collie Hollan, Longview (CA); Iain Dolphe Collie Hollan, Calgary (CA)

(73) Assignee: Integrity Well Completions Inc., Cochrane, Alberta (CA)

( * ) Notice: Subject to any disclaimer, the term of this patent is extended or adjusted under 35 U.S.C. 154(b) by 86 days.

(21) Appl. No.: 15/803,544

(22) Filed: Nov. 3, 2017

(65) Prior Publication Data

US 2018/0128082 A1 May 10, 2018

Related U.S. Application Data

(60) Provisional application No. 62/417,422, filed on Nov. 4, 2016.

(51) Int. Cl.
*E21B 34/14* (2006.01)
*E21B 34/10* (2006.01)
*F16K 25/00* (2006.01)
*E21B 34/00* (2006.01)

(52) U.S. Cl.
CPC ............. *E21B 34/10* (2013.01); *E21B 34/14* (2013.01); *F16K 25/005* (2013.01); *E21B 2034/007* (2013.01)

(58) Field of Classification Search
CPC ......... E21B 34/14; E21B 29/00; E21B 34/063
See application file for complete search history.

(56) References Cited

U.S. PATENT DOCUMENTS

| | | | | |
|---|---|---|---|---|
| 2011/0061856 | A1* | 3/2011 | Kellner | E21B 23/02 166/193 |
| 2013/0233564 | A1* | 9/2013 | Pacey | E21B 34/14 166/373 |
| 2014/0166304 | A1* | 6/2014 | Cast | E21B 43/26 166/374 |
| 2014/0246209 | A1* | 9/2014 | Themig | E21B 34/14 166/374 |
| 2016/0084040 | A1* | 3/2016 | Brasseaux | E21B 34/10 166/374 |
| 2017/0175487 | A1* | 6/2017 | Marcin | E21B 33/12 |

\* cited by examiner

*Primary Examiner* — Kenneth L Thompson
(74) *Attorney, Agent, or Firm* — Gowling WLG (Canada) LLP

(57) ABSTRACT

A downhole tool that comprises an outer housing with an uphole end, a downhole end and an inner surface therebetween. The inner surface defines an interior space with a first inner-diameter and a recess with a larger second inner-diameter. The downhole tool also comprises a sleeve that is positionable within the recess of the outer housing. The sleeve comprises a ramp with a larger inner diameter towards an uphole end. The tool also comprises a seat that is positionable within the sleeve. The seat defines at least one plateau section that is configured to receive and support an equatorial portion of a ball, wherein when a pressure force is applied to the ball and seat, the ball and the seat slide along the ramp and a compressive force is applied to the equatorial portion of the ball.

20 Claims, 10 Drawing Sheets

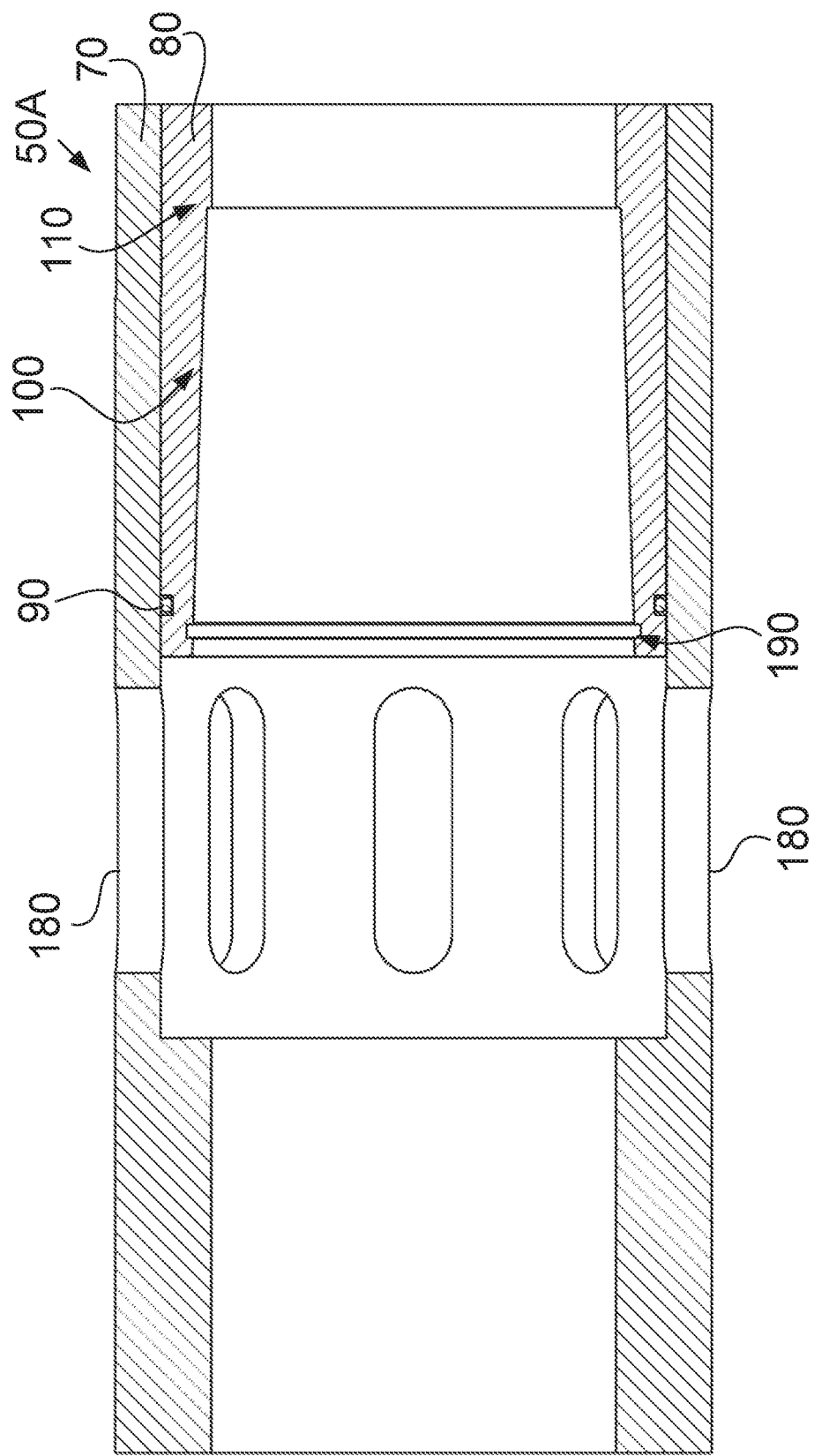

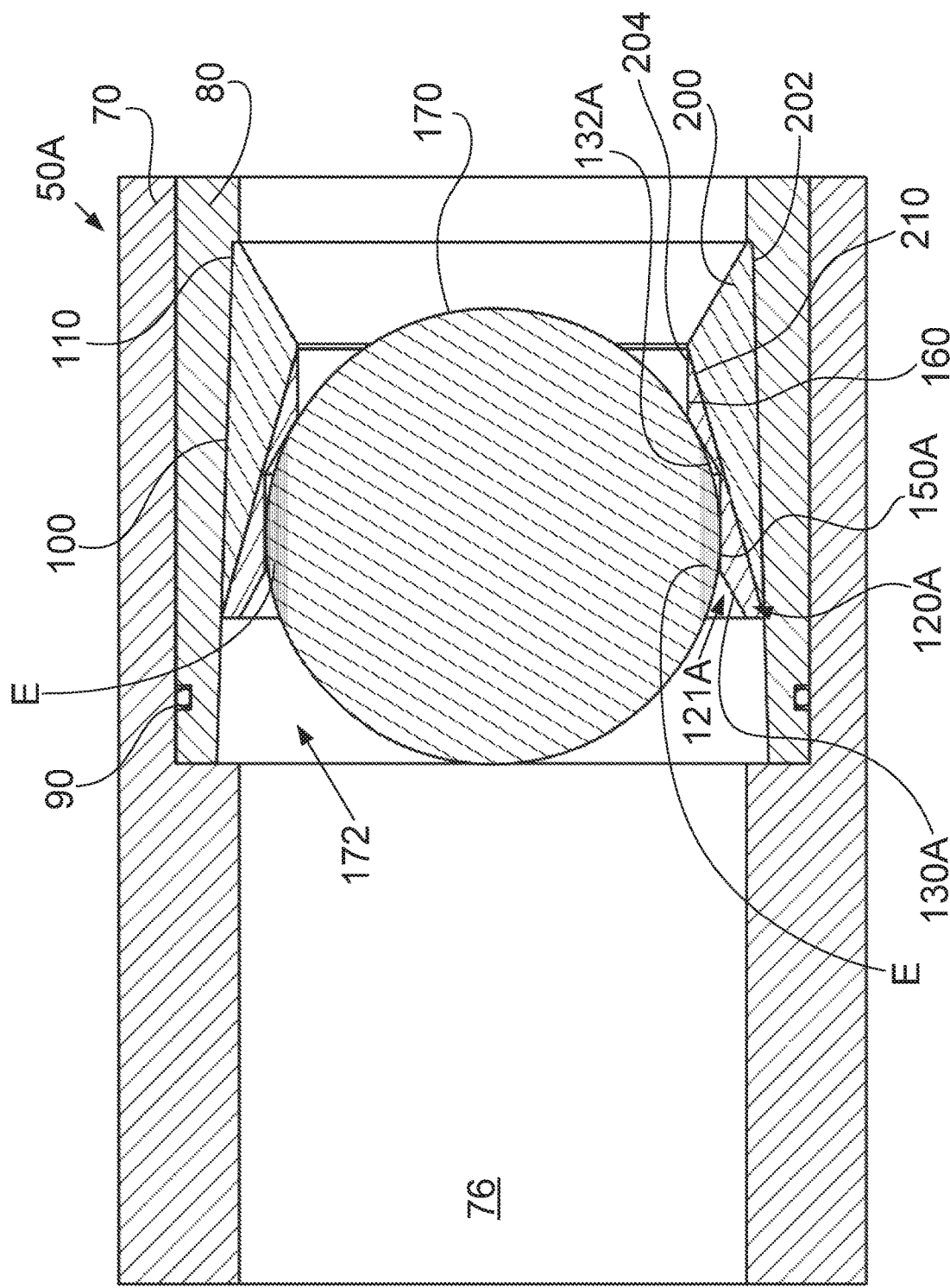

ACTUATABLE SEAT VALVE AND ACTUATORS FOR USE THEREWITH

TECHNICAL FIELD

This disclosure generally relates to production of hydrocarbons. In particular, this disclosure relates to an apparatus and a method for treating a geological formation and/or a hydrocarbon-bearing reservoir therein. Some embodiments of the present disclosure relate to an apparatus and method for performing downhole operations on tubulars that form part of an oil and/or gas well.

BACKGROUND

Fracturing is a process that can be used during well completion in an effort to enhance oil-and-gas production. Fracturing occurs by producing high pressures within a geological formation that contains a hydrocarbon-bearing reservoir. The high pressures physically fracture and crack the formation to provide or improve fluid communication between the reservoir and a well.

Sliding sleeves are a known completion component that can be run into a well. Sliding sleeves typically have radial ports that allow fluid flow between an internal space of tubing or casing and the local environment that surrounds the well. Ball-actuated sliding sleeves can be positioned in a well in a closed configuration. The ball-actuated sliding sleeves can be actuated by dropping a ball of specific size into the well and pumping it with well fluids until it seats on an appropriately sized ball-seat. Continued fluid pressure pushed against the seated ball and moves the sliding sleeve into an open configuration. In the open configuration fluid ports are exposed, which provides fluid communication between the internal space of the tubing or casing and the local environment that surrounds the well. The fluid communication allows a specific region of the geological formation and the hydrocarbon-bearing reservoir to be exposed to a high-pressure fluid from the well, which can create a fracture stimulation. Simulating a specific region of the geological formation and the hydrocarbon-bearing reservoir allows the stimulation operation to be configured to variations in local conditions.

Progressive access to different stages of the reservoir can be achieved by using balls and ball-receiving seats of progressively increasing diameters from a distal end of the well towards a surface end of the well. Small diameter balls and corresponding small ball seats have a small flow channel which can restrict flow rate or can produce an excessive pressure drop. Small components are also susceptible to erosion causing premature failure. These considerations give a lower limit to the size of the smallest ball that can practically be used in a ball-drop fracturing operation. For example, under conditions within a typical oil-well the smallest ball may be no smaller than about 0.750 inches in diameter (one inch is equivalent to about 0.0254 metres). The maximum diameter for the largest ball is limited because it must fit and be free to move within the smallest diameter of the well, within either a well liner or a casing. For example, a typical oil-well casing-string has about a 4.5 inch outer diameter (OD), an inner diameter (ID) of about 4 inches and a drift diameter is of about 3.875 inches. This typically limits the maximum diameter of a largest ball to about 3.813 inches.

The difference in diameter between successive balls must be such that a given ball can pass through the ball-receiving seat that is sized for the next largest ball.

During fracturing operations, the ball and ball-receiving seat must withstand a large hydraulic pressure. For example a hydraulic pressure in excess of 10,000 pounds per square inch (psi, one psi is equivalent to about 6.89 kilo-Pascals). Typically ball-receiving seats have a significant overlap of material to support the ball during a pressure loading phase of the fracturing operation. For example, the ball-receiving seat may have an ID which is about 0.240 inches smaller than the outside diameter of the ball. However, even when using durable materials, such as ductile iron, balls and seats can plastically deform or physically break apart under high hydraulic pressures, which causes the functional seal formed by the ball and seat to be lost.

A known approach for addressing the dimensional limitations of ball and ball-receiving seat systems is to use malleable balls or dissolvable balls. Malleable balls may be introduced into a well and become seated in a downhole ball-receiving seat to form a ball-seat unit. The ball-seat unit may then be moved by pressurized fluids within the wellbore to move the ball-seat unit to an actuated position which may facilitate a treatment of the hydrocarbon-bearing reservoir. While in the actuated position, the pressurized fluids, or higher pressure fluids, may deform the ball within the ball-seat unit. The deformed ball can then move through the ball-receiving seat, which disassembles the ball-seat unit. Alternatively, dissolvable balls can introduced into a well and become seated in a downhole ball-receiving seat to form a dissolvable ball-seat unit. The dissolvable ball-seat units can also be moved by pressurized fluid to an actuated position. While in the well, the dissolvable balls can dissolve in the presence of well fluids. Typically when the dissolvable ball-seat unit achieves the actuated position, the ball will dissolve enough to allow the ball to pass through the ball-receiving seat, which disassembles the dissolvable ball-seat unit. Disassembly of the ball-seat units or the dissolvable ball-seat units may be required by an operator to restore fluid communication across the ball-seat unit.

Malleable balls, composite balls, and dissolvable balls are known to physically break up or plastically deform when they contact the ball-receiving seat. These broken balls are not able to form a moveable unit with the ball-receiving seat and may require the use of further balls. Furthermore, when high hydraulic pressures are applied to the moveable unit, the seat itself may deform and the intended seal with the ball is lost.

SUMMARY

Embodiments of the present disclosure relate to a downhole tool and/or a downhole apparatus that can be used for treating, including stimulating, an oil and/or gas wellbore tubular, a geological formation or a hydrocarbon-bearing reservoir that is proximal to an oil and/or gas well.

Some embodiments of the present disclosure relate to a downhole tool that is connectible to a string of tubulars for inserting into a well. The downhole tool comprises an outer housing that comprises an uphole end, a downhole end and an inner surface defined therebetween. Each end is connectible to the string of tubulars. The inner surface defines an interior space with a first inner-diameter and the inner surface also defined a recess with a second inner-diameter that is larger than the first inner-diameter. The downhole tool also comprises a sleeve that is slidably positionable within the recess of the outer housing. The sleeve comprises an uphole end, a downhole end and a ramp is defined therebetween. The ramp has a larger inner diameter towards the uphole end. The downhole tool also comprises a seat that is positionable within the sleeve. The seat defines at least one plateau section that is configured to receive and laterally support an equatorial portion of a ball, wherein when a pressure force is applied to the ball and seat, the ball and the seat are slidable along the ramp towards the downhole end of the sleeve.

Some embodiments of the present disclosure relate to a method of treating a geological formation. The method comprising the steps of: positioning a downhole tool within a well that extends into the geological formation, wherein the downhole tool comprises an outer sleeve and a seat that is slidable therein; engaging an equatorial portion of the actuator with the seat; sliding the seat in a downhole direction; and compressing the equatorial portion of the actuator. During this method, sliding the seat in the downhole direction also establishes fluid communication between an internal space of the downhole tool and the geological formation.

One failure mode for balls is material yielding under shear stresses that occurs when the ball contacts a shoulder of the ball seat. Embodiments of the present disclosure may provide a higher load-support for a smaller contact shoulder by increasing the contact area between the ball and the seat by engaging an equatorial portion of the ball with the seat and, optionally further regions of the ball may be engaged by the seat as well. For clarity, when the seat engages the ball the seat makes physical contact with a portion of the equatorial portion of the ball. When the ball is engaged by the seat, a fluid tight seal is formed that prevents fluid communication thereacross. This is in contrast with known ball and seat systems where the seat typically engages only a lower portion of the ball. The movement of the ball and seat along the ramp produces a compressive force that acts upon the seat and upon the equatorial portion of the ball that is engaged by the seat. This compressive force may also provide a frictional force that is axially distributed over an area at the equatorial portion of the ball. Without being bound by any particular theory, the compressive force and/or the frictional force may allow the ball and seat to withstand larger pressure and/or shear forces that are generated during hydraulic fracturing or other well-stimulations and/or production operations.

Embodiments of the present disclosure may produce inwardly, radial compressive stresses which may enable the ball to withstand greater wellbore pressure without ball failure or yielding. Furthermore, some embodiments of the present disclosure relate to the use of degradable materials in manufacturing some or all of a ball and a downhole tool with a seat. Because the design of the downhole tool allows the ball and/or seat to withstand greater wellbore pressures without failure and without forcing the ball through the seat the degradable materials allow the ball and/or portions or all of the seat to be degraded when desired. Furthermore, some embodiments of the present disclosure allow a flow-back operation to dislodge the ball and seat from an initial position within the wellbore. One or more of these embodiments may avoid the necessity of expensive fishing operations or drilling-out operations to remove the ball and portions of the downhole tool from the wellbore to allow production of oil and/or gas therethrough.

BRIEF DESCRIPTION OF THE DRAWINGS

These and other features of the present disclosure will become more apparent in the following detailed description in which reference is made to the appended drawings.

FIG. 9 is a mid-line cross-sectional view of FIG. 6 with the seat removed; and FIG. 10 is mid-line, cross-sectional view of a plug seat with a ball received therein according to another embodiment of the present disclosure.

DETAILED DESCRIPTION

Definitions

Unless defined otherwise, all technical and scientific terms used herein have the same meaning as commonly understood by one of ordinary skill in the art to which this disclosure belongs.

As used herein, the term "about" refers to an approximately +/−10% variation from a given value. It is to be understood that such a variation is always included in any given value provided herein, whether or not it is specifically referred to.

Embodiments of the present disclosure will now be described with reference to FIG. 1 to FIG. 10, which show representations of an actuatable-valve seat according to the present disclosure.

Figure 1:
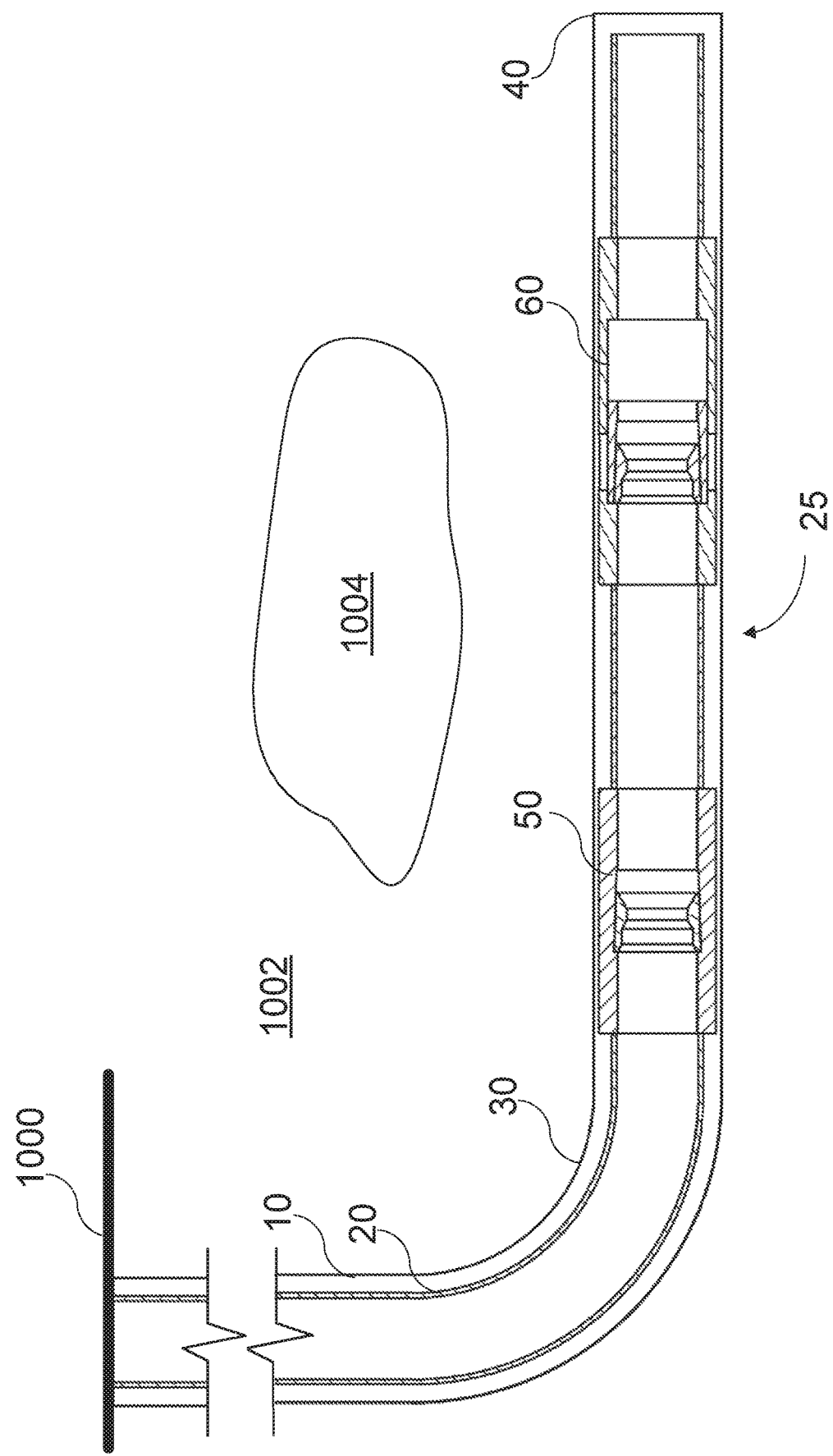
FIG. 1 is a side-elevation schematic of an example of a well that includes a tubular therein with two embodiments of the present disclosure incorporated with the tubular.

FIG. 1 shows an example of an oil and gas well 10 that extends from a surface 1000 into a geological formation 1002 that contains a hydrocarbon-bearing reservoir 1004. The well 10 extends from the surface 1000 so that at least part of the well 10 is proximal the hydrocarbon bearing reservoir 1004. The skilled reader will appreciate that the term "oil and gas well" refers to a well that can produce oil, gas or both from the hydrocarbon-bearing reservoir 1004.

FIG. 1 shows the well 10 as being deviated from a vertical orientation so that there is a horizontal portion 25 of the well 10. Typically the horizontal portion 25 has a heel section 30 and a toe section 40 and the well 10 is drilled so that the hydrocarbon-bearing reservoir 1004 is proximal the horizontal section 25. However, it is understood by those skilled in the art that in other embodiments of the present disclosure, the well 10 may be a substantially vertical well that does not have a horizontal section 25. For clarity, the following discussion will refer to a direction within the well 10 as being uphole or downhole. Regardless of the orientation of the well 10, uphole refers to a direction within the well 10 that is towards the surface 1000. Downhole is an opposite direction within the well 10 that is away from the surface 1000.

The well 10 may be open hole or it may be completely or partially lined. A string of tubulars 20 is positioned within the well 10. The string of tubulars 20 is a production string, coiled tubing or any other type of tubular that can be inserted into the well 10 at the surface 1000.

FIG. 1 also depicts a first tool 50 and a second tool 60 positioned within the well 10. The first tool 50 and the second tool 60 are shown in FIG. 1 as being positioned proximal to the hydrocarbon-bearing reservoir 1004; however, this may not be necessary in all embodiments of the present disclosure.

The first tool 50 and the second tool 60 are connectible to the string of tubulars 20 so that in the absence of any plugs within the well 20 there is fluid communication within an internal space of the string of tubulars 20 that may extend from the surface 1000, through the first tool 50 and second tool 60. The first tool 50 and the second tool 60 may have threaded ends, or otherwise, in order to connect the tools 50, 60 to the string of tubulars 20. The first tool 50 and the second tool 60 may be substantially the same, with the same components, or not. In some embodiments of the present disclosure, the first tool 50 and the second tool 60 have the same components and the primary difference between the two tools 50, 60 is the dimension of a central aperture of each. These dimensional differences permit actuators 170, such as a ball (shown in FIG. 3), of different sizes to be introduced into the string of tubulars 20 at the surface 1000 and a ball 170 of a first dimension may pass through the first tool 50 and engage the second tool 60, as described further below. FIG. 1 shows the first tool 50 and the second tool 60 connected by a length of tubular 20. In an alternative configuration, not shown, the first tool 50 and the second tool 60 may connect directly to each other. A third tool and further subsequent tools are also an option.

Figure 2:
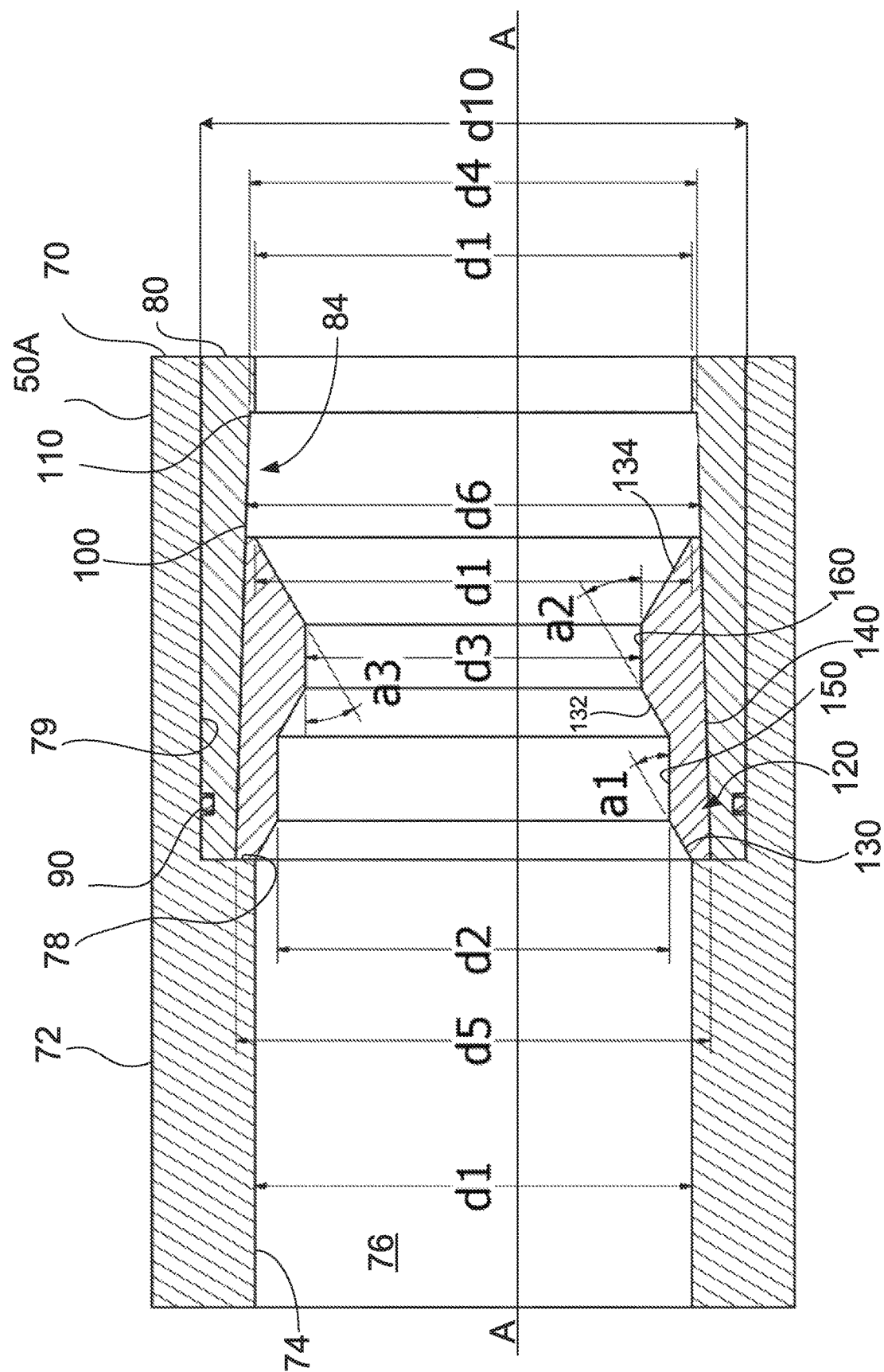
FIG. 2 is a mid-line, cross-sectional view of a seat according to one embodiment of the present disclosure, the seat is shown in a first position.

FIG. 2 depicts one embodiment of a downhole tool 50A. The downhole tool 50A may be a representative example of the first tool 50 and/or the second tool 60. The downhole tool 50A comprises an outer housing 70, an inner sleeve 80 and a seat 120.

The outer housing 70 is connectible to the string of tubulars 20 to carry and protect the inner sleeve 80 and the seat 120. The outer housing 70 may also provide pressure and tensile integrity to the string of tubulars 20 in which the tool 50A is connected and run into the well 10. The outer housing 70 has an outer surface 72 that may be positioned proximal to a hydrocarbon-bearing reservoir 1004. The outer housing 70 also has an inner surface 74 that defines an internal space 76 with an inner diameter d1. When the downhole tool 50A is connected to the string of tubulars 20, the internal space 76 is in fluid communication with the internal space of the string of tubulars 20. The inner surface 74 may define a first shoulder 78 and a recess 79. The recess 79 defines a larger inner diameter d10 than other portions of the outer housing 70. In some embodiments of the present disclosure, the outer housing 70 defines one or more fluid ports 180 (see FIG. 5). The fluid ports 180 may provide fluid communication between the internal space 76 and the environment outside of the downhole tool 50A.

The inner sleeve 80 is positioned within the recess 79 of the outer housing 70. When the downhole tool 50A is run into the well 10, one end of the inner sleeve 80 abuts or is positioned adjacent the first shoulder 78. The inner sleeve 80 has an outer surface 82 that is in a slidable relationship with the portion of the inner surface 74 that defines the recess 79. The outer surface 82 may define a groove for housing a sealing member 90. The sealing member 90 provides a fluid-tight seal between the inner surface 74 of the outer housing 70 and the outer surface 82 of the inner sleeve 80. In some embodiments of the present disclosure the sealing member 90 may be an o-ring type of seal. In other embodiments of the present disclosure the sealing member 90 may be any other type of seal that provides a fluid-tight seal under the temperature, chemical and pressure conditions that are present in well 10. The inner sleeve 80 also has an inner surface 84. A least a portion of the inner surface 84 may be a ramp 100. The ramp 100 extends into the internal space 76 so that the inner diameter of the inner sleeve 80 is smaller towards a downhole end of the ramp 100 as compared to an uphole end of the ramp 100 (see d4 compared to d6 and d5 in FIG. 2, where d4 is less than d6 which is less than d5). The ramp 100 may be oriented at an angle relative to a central axis A of the downhole tool 50A. The ramp 100 may have a substantially constant slope or not. In some embodiments of the present disclosure the inner sleeve 80 defines a second shoulder 110 that is positioned at the downhole end of the ramp 100. In some embodiments of the present disclosure the ramp 100 comprises some, most or all of the inner surface 84.

The seat 120 is positioned within the inner sleeve 80 so that an outer surface 122 of the seat 120 is in a slidable relationship with the inner surface 84 and at least a portion of the ramp 100 of the inner sleeve 80. In some embodiments of the present disclosure, the seat 120 can slide axially along the inner surface 84 and along the ramp 100. As the seat 120 moves axial towards the downhole end of the ramp 100 the seat 120 may be compressed. In some embodiments of the present disclosure, the outer surface 122 may be shaped to substantially match the angle of the ramp 100 relative to the central axis A.

In some embodiments of the present disclosure the outer housing 70 and the inner sleeve 80 may be made from the same, or a similar, high strength material.

The seat 120 may have a cross-sectional profile that includes (moving from uphole to downhole) a first angled edge 130, a first plateau 150, a second angled edge 132, a second plateau 160 and a third angled edge 134. The first and second angled edges 130, 132 each extend into the interior space 76. The angle of the first angled edge 130 is shown as a first angle a1 in FIG. 2 that is relative to the central axis A. The angle of the second angled edge 132 is shown as a second angle a2 in FIG. 2 that is relative to the central axis A. The angle of the third angled edge 134 is shown as a third angle a3 in FIG. 2 that is relative to the central axis A. The angled edges 130, 132, 134 can each form the same angle relative to the central axis A, or not. In some embodiments of the present disclosure the angled edges 130, 132, 134 can form an angle of between about 10 degrees and 90 degrees relative to the central axis A. The first plateau 150 defines an inner diameter d2 that is smaller than the inner diameter d1 of the outer housing 70. The second plateau 160 defines an inner diameter d3 that is smaller than d2. The angled edges 130, 132, 134 may each be configured to reduce, minimize or prevent a pressure drop across the downhole tool 50A when fluids are flowing therethrough and facilitate the passage of other objects within the internal space 76. The angled edge 132 may also be configured to provide lateral support to the ball 170 when it is seated within the seat 120, as discussed further below.

In some embodiments of the present disclosure, the seat 120 is made from a material that is more malleable or that is more degradable than the materials of the outer housing 70 and the inner sleeve 80. In some embodiments of the present disclosure, the seat 120 is made from a material that can degrade within the well 10. The material may be selected so that the rate at which the seat 120 degrades can be predicted based upon the conditions within the well 10. In some embodiments of the present disclosure, one or more portions of the seat 120 can be made from one or more degradable materials that each comprise a metal, an alloy and/or a polymer and that will degrade, or demonstrate accelerated degrading, in the presence of dissolved salts that are present in the well 10 or fluids therein; in the presence of water; in the presence of hydrocarbons or combinations thereof. One non-limiting example of a suitable degradable material is a degradable magnesium alloy.

Figure 3:
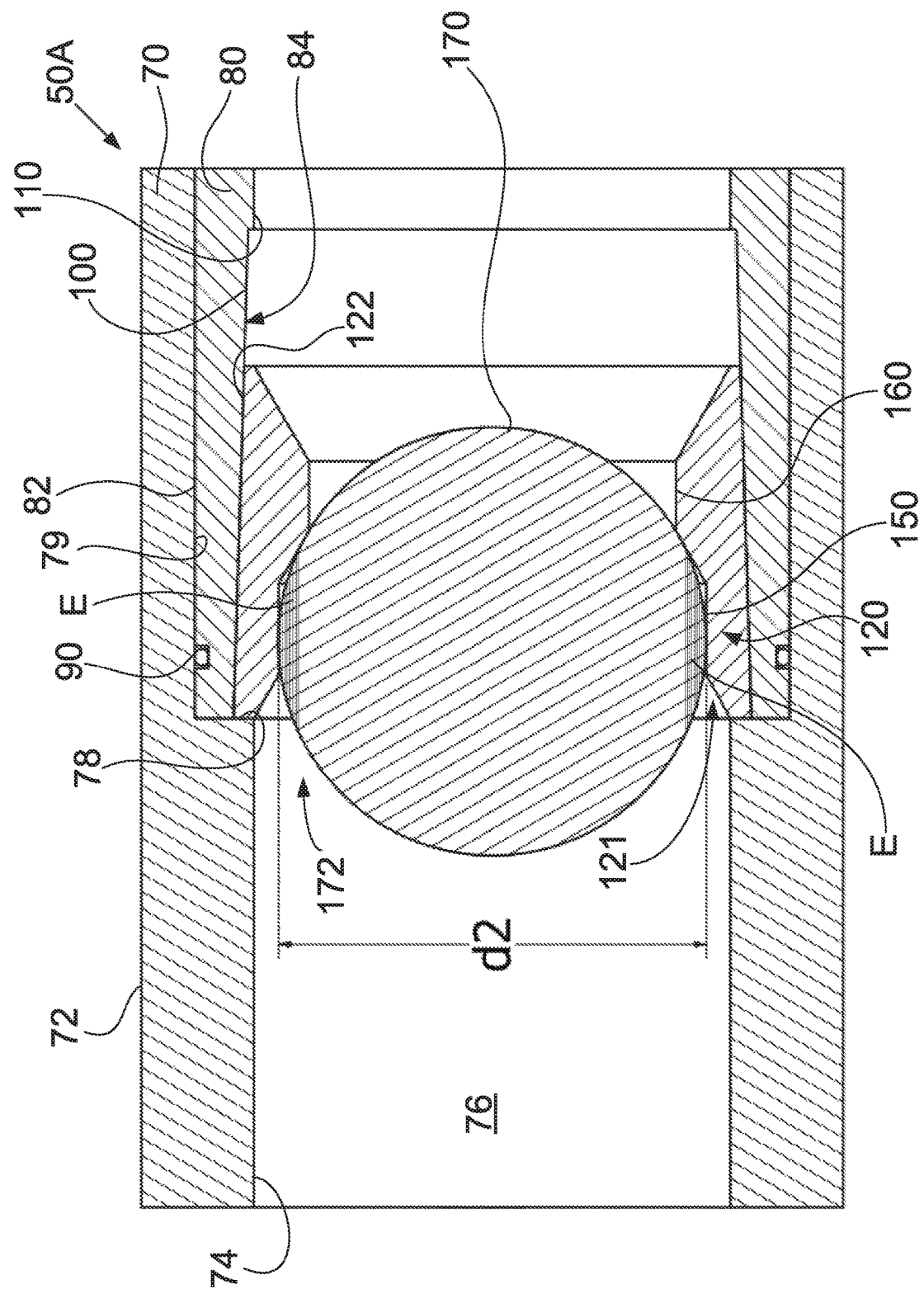
FIG. 3 is a mid-line, cross-sectional view of the seat of FIG. 2 with a ball received therein.
Figure 4:
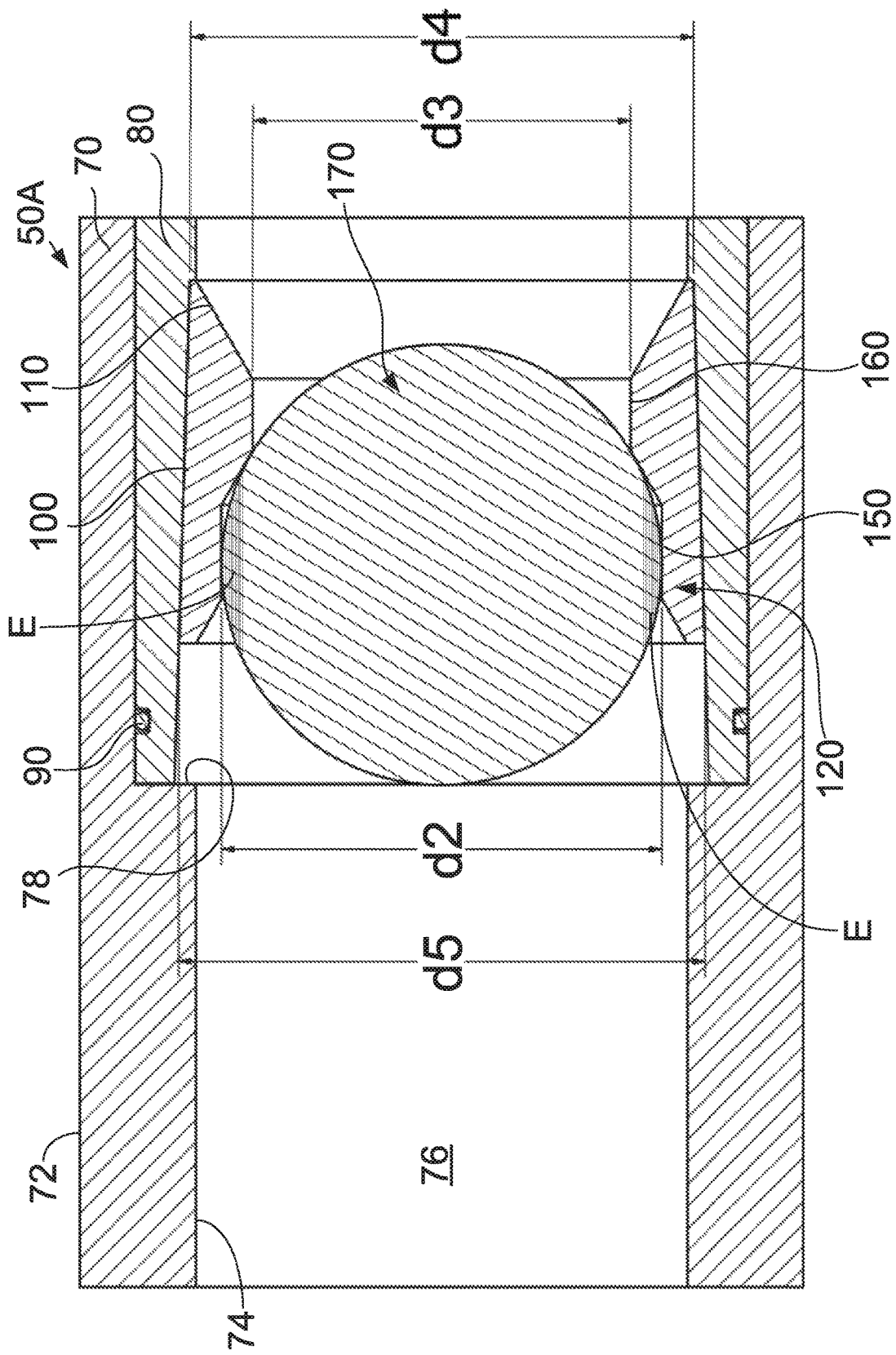
FIG. 4 is a mid-line, cross-sectional view of the seat and ball of FIG. 3 shown in a second position.

FIG. 3 shows the ball 170 engaged by the seat 120 seated within the downhole tool 50A. This configuration may be referred to as the first position. The ball 170 may be made from a material that dissolves within the environment of the well 10. The material may be selected so that the rate at which the ball 170 dissolves can be predicted based upon the conditions within the well 10.

In some embodiments of the present disclosure, the ball 170 has a substantially consistent outer diameter about its entire outer surface. As will be described further below, when the ball 170 engages a seat 120, the outer lateral edges of the ball 170 may be referred to herein as an equatorial portion E. For the purposes of the present disclosure, the equatorial portion E is the part of the ball 170 that is closest to the outer housing 70 when the ball 170 is seated in the seat 120. However, as will be appreciated by those skilled in the art, the ball 170 can be a shape other than a sphere. For example the ball 170 can be an actuator other than a ball, such as a dart or a bar or a plug, provided that the actuator can be released from the surface 1000, travel through the well 10 so that a portion of the actuator with a circular shape and a equatorial portion thereof can engage the seat 120 as described herein.

As will be appreciated by those skilled in the art, the downhole tool 50A described above describes tools that can have different dimensions so that the first tool 50 may have a larger inner diameter d3 than the second tool 60 that is positioned within the well 10 downhole from the first tool 50. When a ball 170 is introduced into the well 10 at the surface 1000, the ball 170 can travel through the string of tubulars 20 until such time that it contacts a seat 120 that has an inner diameter d2 and a second inner diameter d3 that are dimensioned to seat the ball 170.

The dimensions of the seat 120 are designed so that a ball 170, or a different shaped actuator, will be seated with at least a portion of the equatorial portion E of the ball 170 being laterally supported by part of the seat 120. As shown in FIG. 3, the inner surface 121 defines a first plateau 150 that can support at least a portion of the equatorial portion E of the ball 170. Without being bound by any particular theory, it is postulated that lateral support of at least a portion of the equatorial portion E of the ball 170 allows the seat 120 to be made with a smaller dimensional overlap between the ball 170 and the seat 170, which in turn means that the inner diameter d3 of the seat 120 may be larger than known seats of a similar pressure rating. Having a larger inner diameter d3 may allow for a greater number of downhole tools 50A to be employed within a given well 10. Additionally, the lateral support of the equatorial portion E of the ball 120 provided by the seat 120 may allow the user to employ greater pressures on top of a seated ball 170 without causing the ball 170 to deform or partially degrade and then pass through the seat 120.

Some embodiments of the present disclosure relate to a second downhole tool 50B (not shown) that includes the same components as described above for the downhole tool 50A. At least one difference between the downhole tool 50A and the second downhole tool 50B is that the second downhole tool 50B does not move to expose fluid ports. Instead, the second downhole tool 50B forms a plug within the well 10. In these embodiments the inner sleeve 80 is fixed within the outer housing 70 and it does not slide therewithin. In these embodiments, when a ball 170 is seated within the seat 120, fluid communication past the seat 120 is stopped, at least temporarily until such time that one or both of the ball 170 or the seat 120 degrade or until such time that the pressure downhole of the seat 120 is greater than the pressure uphole of the seat 120. This pressure differential can disengage the ball 170 from the seat 120. Backflow operations can create a downhole environment where the pressure downhole of the seat 120 is greater than the pressure uphole of the seat 120.

FIG. 10 shows another embodiment of the present disclosure where a seat 120A comprises an inner surface 121A that defines a first angled edge 130A, a first plateau 150A, a second angled edge 132A and, optionally a second plateau 160A. The inner surface 121A may modular and made up of one or more concentrically arranged components. Optionally, the one or more concentrically arranged components may be made from a dissolvable material. Seat 120A is housed within an outer seat 200, which has an outer surface 202 and an inner surface 204. The outer seat outer surface 202 may slide along the ramp 100, and the outer seat inner surface 204 may define a second ramp 210. It is understood that references herein below to the seat 120 also refer to the seat 120A, unless the context of a particular passage clearly indicates otherwise.

Some embodiments of the present disclosure relate to the ramp 100 and the second ramp 210 not being flat with a constant slope but as having a curved and possibly a multiple-tiered surface.

Some embodiments of the present disclosure relate to the first plateau 150 of the seat 120 having one or more gripping members for frictionally engaging the ball 170 when seated. The gripping members may provide a higher coefficient of friction on the first plateau 150 and any other portion of the inner surface 121 of the seat 120 to facilitate gripping the equatorial portion E and holding the ball 170 in place and prevent rotation of same, which may be useful if the ball 170 needs to be drilled out. In some embodiments of the present disclosure, the one or more gripping members may be a coating that is applied to one or more portions of the inner surface 121 prior to using the downhole tool 50A as described herein.

Optionally, portions or all of the seat 120 may be coated or treated with a coating for reducing erosion and/or any detrimental effects of wellbore fluids in order to protect the seat 120 by known coatings and treatments. Optionally, any protective coatings or treatments that are applied to any surface of the seat 120 or ball 170 are configured to be at least partially removable under the conditions within the well 10 or when the ball 170 is engaged by the seat 120. In some embodiments a protective coating or treatment may protect a seat 120 or ball 170 that is at least partially made of one or more degradable materials from degrading until such time that the ball-seat unit 172 is formed. Forming the ball-seat unit 172 may damage the coating or treatment and thereby make at least a portion of the seat 120 and/or the ball 170 susceptible to degrading within the well 10. In this fashion, the seat 120 and/or the ball 170 can be converted from a non-degradable format to a degradable format once the ball-seat unit 172 is formed.

In operation, the string of tubulars 20 that includes one or more downhole tools 50A are positioned within the well 10. The dimensions of the one or more downhole tools 50A are designed to provide an incrementally smaller d3 from the uphole direction towards the downhole direction. A ball 170 is introduced into the string of tubulars 20 at the surface 1000. Depending upon the outer diameter of a given ball 170, the ball 170 will travel through the interior space of the string of tubulars 20, passing through downhole tools 50A until the ball 170 reaches and is engaged by a seat 120 with an inner diameter d3 that is smaller than the outer diameter of the ball 170. For clarity, it is understood that references to the seat 120 will also refer to the seat 120A. At this point, the ball 170 is engaged by the seat 120 and forms a fluid tight seal that prevent fluid communication thereacross. When the ball 170 and the seat 120 are engage they may collectively be referred to as a ball-seat unit 172 and the tool 50A is in the first position. When engaged, at least a portion of the equatorial portion E of the ball 170 contacts, engages and is supported by a portion of the seat 120. At the same time, a downhole portion of the ball 170 may also supported by the seat 120. The downhole portion of the ball 170 is any portion of the ball 170 that is positioned downhole of the equatorial portion E when the ball 170 is engaged with the seat 120. For example, the seat may be configured so that the first plateau 150 can provide lateral support to the equatorial portion E of the ball 170 and the second angled edge 132 supports the downhole portion of the ball 170. For clarity, the ball-seat unit 172 forms a moveable seal that prevents fluid communication across the downhole tool 50A.

When the ball 170 is seated, a first hydraulic pressure can be applied within the string of tubulars 20. The hydraulic pressure then pushes against the ball-seat unit 172, which causes the seat 120 to slide downhole along the ramp 100. As the seat 120 slides along the ramp 100, the seat 120 is compressed, which causes radial compression of the equatorial portion E of the ball 170 within the seat 120. The seat 120 may slide all the way along the ramp 100 until it reaches the second shoulder 110 or the seat 120 may only slide partially along the ramp 100 (see FIG. 4). When the seat 120 stops sliding along the ramp 100 is referred to as the second position. When the seat 120 is in the second position, a second hydraulic pressure, which may or may not be the same as the first hydraulic pressure, can act upon the ball-seat unit 172, which causes the inner sleeve 80 to slide downhole within the recess 79 away from the first shoulder 78 (see FIG. 5). This is referred to as the third position. When the downhole tool 50A is in the third position, the wellbore pressure may be significantly increased, which may cause further compression of the seat 120 and further radial compression of the equatorial region E of the ball 170 within the seat 120. Without being bound by any particular theory, radial compression of seat 120 and the ball 170 may allow for the seat 120 and the ball 170 to withstand greater hydraulic pressures without plastically deforming or physically breaking up so that the seal formed by the ball-seat unit 172 can be maintained in the face of high hydraulic fluid pressures.

The movement of the downhole tool 50A described herein between the first position and the various other positions described herein at a variety of different hydraulic pressures within the well 10. For example, in some non-limiting embodiments of the present disclosure the ball 170 may engage the downhole tool 50A at various hydraulic pressure within the well of between about 1 psi and about 3000 psi.

In some non-limiting embodiments of the present disclosure, the ball-seat unit 172 can slide downhole, along the ramp 100 at a hydraulic pressure within the well 10 of between about 500 psi and about 5000 psi. In some non-limiting embodiments of the present disclosure, the radial compression of the ball 170 may begin at a hydraulic pressure within the well 10 of between about 500 psi to about 15,000 psi. Radial compression of the ball 170 may continue to increase as the ball-seat unit 172 slides further along the ramp 100. Table 1 below provides some non-limiting example hydraulic pressures and the manner by which the downhole tool 50A and the ball 170 respond to said hydraulic pressures.

TABLE 1

Wellbore Pressures and Tool Responses

| Pressure (psi) | Tool |
| --- | --- |
| 1000 | Ball is engaged in seat with some compression |
| 2000 | Seat slides downhole and sleeve opens port(s) |
| 10,000 | Equatorial portion of ball further compressed by seat |

Figure 5:
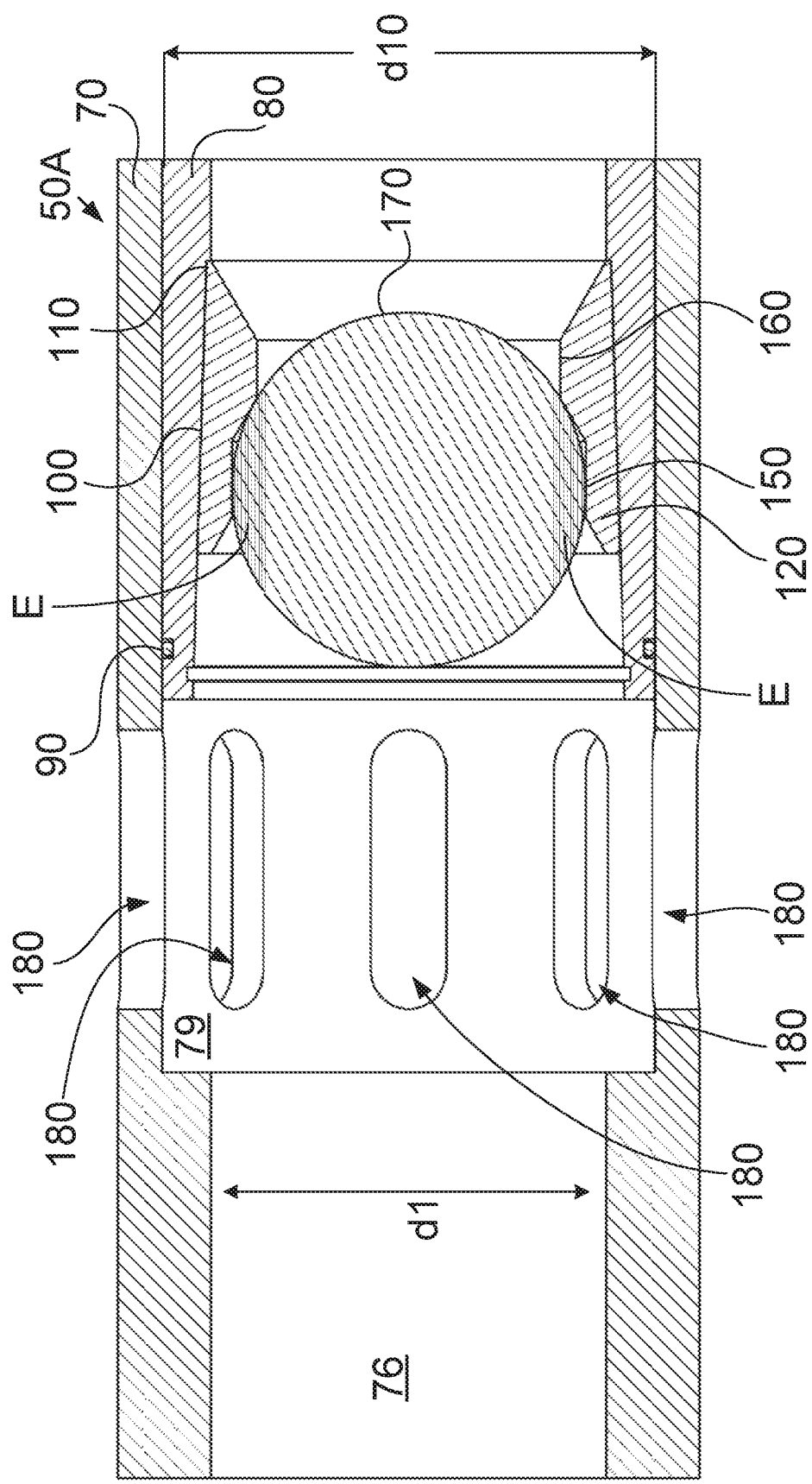
FIG. 5 is a mid-line, cross-sectional view of a seat and ball according to another embodiment of the present disclosure shown in a third position to reveal one or more fluid ports of the tubular.

As shown in FIG. 5 when the inner sleeve 80 slides along the recess 79 one or more fluid ports 180 can come into fluid communication with the internal space 76 of the downhole tool 50A. When this fluid communication is established, a fluid treatment for the hydrocarbon-bearing reservoir 1004 can be introduced into the internal space 76 of the string of tubulars 20 and the fluid treatment will flow from the internal space 76, through the one or more open fluid ports 180 and into either of both of the geological formation 1002 or the hydrocarbon-bearing reservoir 1004. As will be appreciated by those skilled in the art, the fluid treatment may comprise at least one of a chemical treatment, a pressure treatment, a proppant-containing treatment or combinations thereof. In some embodiments of the present disclosure the open one or more fluid ports 180 can be used in hydraulic fracturing treatments in an effort to improve fluid communication between the hydrocarbon-bearing reservoir 1004 and the internal space 76 of the string of tubulars 20.

Figure 6:
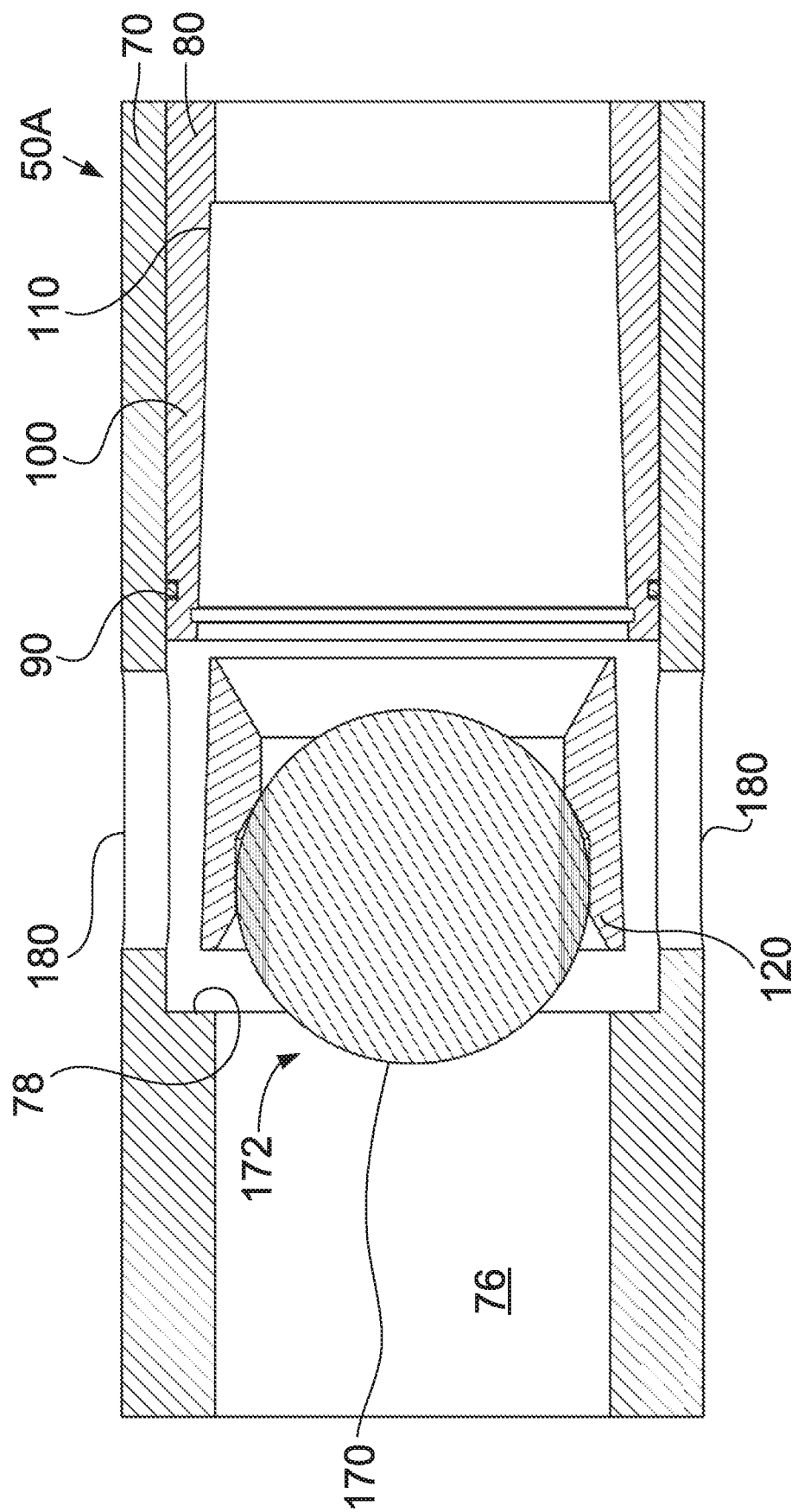
FIG. 6 is a mid-line, cross-sectional view of the seat and ball received therein of FIG. 5, the seat is shown in a fourth position.

As shown in FIG. 6 the ball-seat unit 172 can be dislodged from the inner sleeve 80. This is referred to as the fourth position. For example, if the hydraulic pressure downhole from the ball-seat unit 172 is greater than the hydraulic pressure uphole of the ball-seat unit 172, the ball-seat unit 172 can move uphole and off the ramp 100. In some embodiments of the present disclosure the first shoulder 78 may prevent the ball-seat unit 172 from moving uphole past the first shoulder 78.

Figure 7:
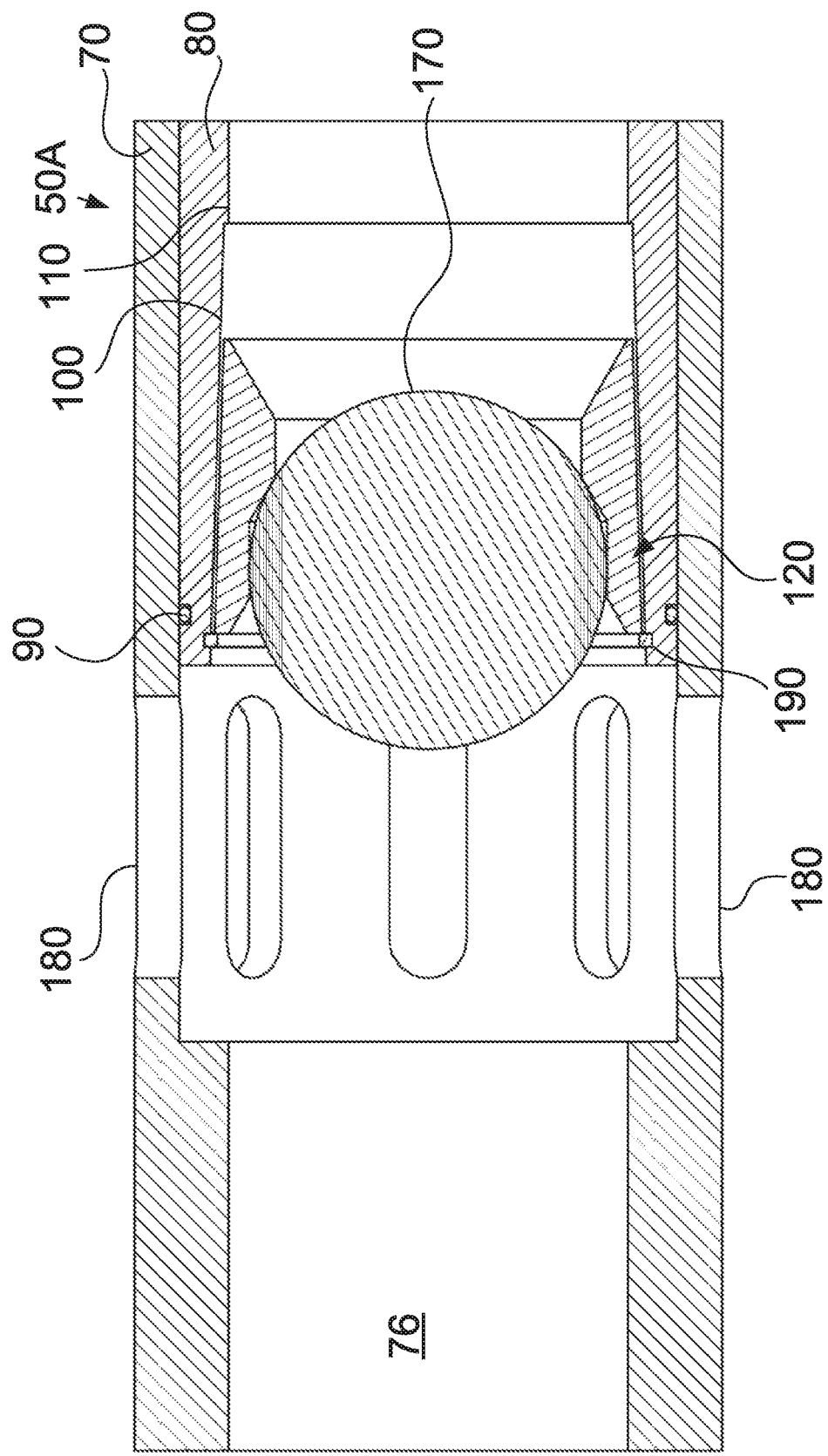
FIG. 7 is mid-line, cross-sectional view of a seat and a ball according to another embodiment of the present disclosure, the seat is shown in a fifth position.

FIG. 7 shows another embodiment of the present disclosure that includes a retainer ring 190 that is positioned at the uphole end of the inner sleeve 80. The retainer ring 190 prevents the uphole movement of the ball-seat unit 172 when the hydraulic pressure downhole of the seat 120 is greater than the hydraulic pressure uphole of the seat 120. When retained by the retainer ring 190, the ball-seat unit 172 is in a fifth position. The retainer ring 190 prevents the seat 120 from being dislodged from the inner sleeve 80 during backflow operations. In these embodiments, backflow operations may disengage the ball 170 from the seat 120, while keeping the seat 120 within the inner sleeve 80 for further use.

Figure 8:
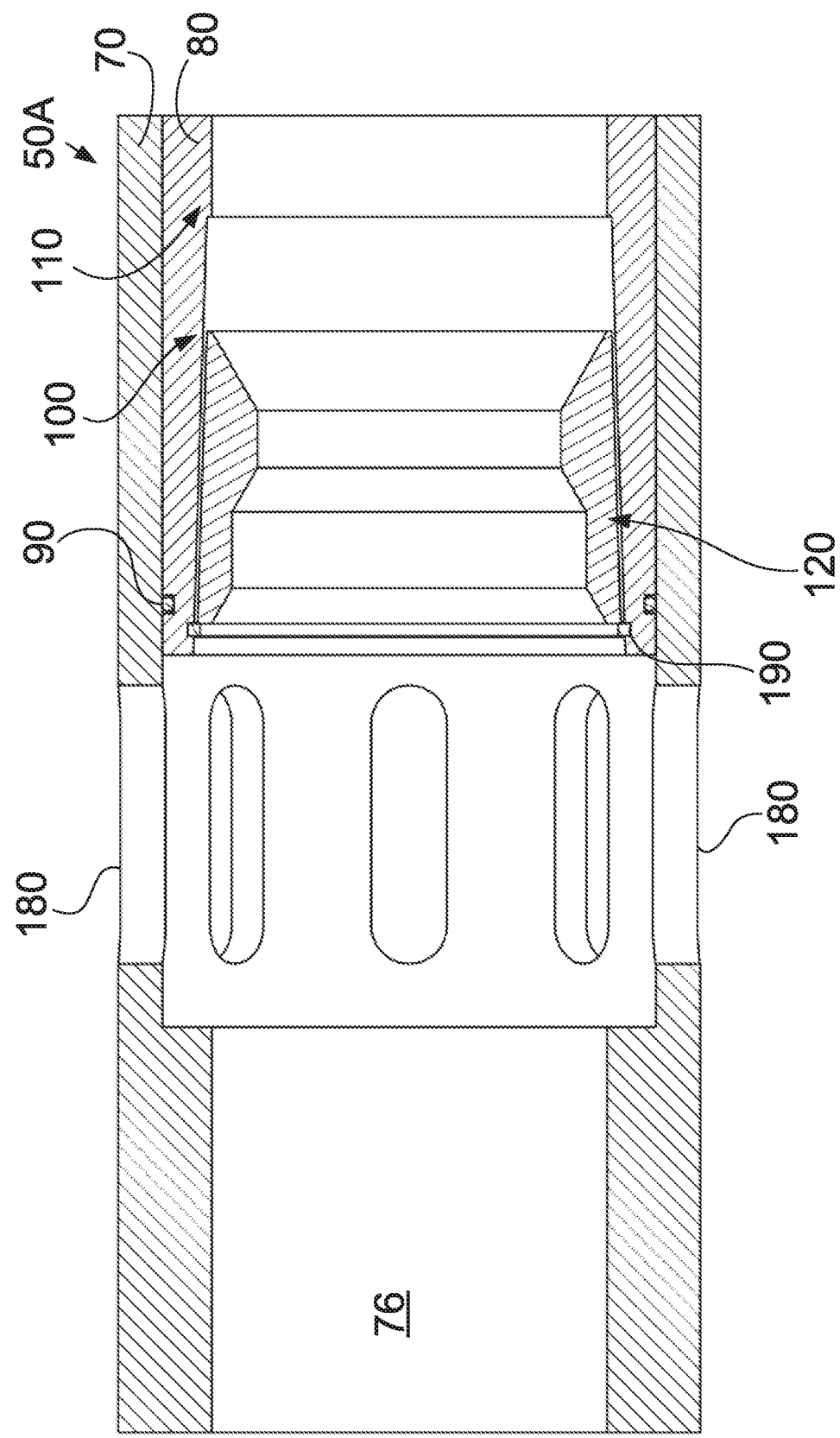
FIG. 8 is mid-line, cross-sectional view of the seat of FIG. 7, the seat is shown in the fifth position.

FIG. 8 shows another embodiment of the present disclosure that relates to the ball 170 being made of a dissolvable material. In FIG. 8 the ball 170 has dissolved after the inner sleeve 80 has slid downhole to open the one or more fluid ports 180. This configuration may establish fluid communication between the inner space 76 and the one or more ports 180 and a portion of the inner space 76 that is downhole of the seat 120.

FIG. 9 shows embodiments of the present disclosure that relate to both the ball 170 and the seat 120 being made of a dissolvable material. In FIG. 9 the ball 170 and the seat 120 have dissolved after the inner sleeve 80 has slid downhole to open the one or more fluid ports 180.

EXAMPLES

As summarized in Table 2, laboratory pressure tests were performed on the following configurations:

Configuration A: an industry-standard ball and seat configuration that included an entry angle, a single plateau, and an exit angle. The industry standard configuration does not include equatorial contact or compression of the ball;

Configuration B: the downhole tool 50A and a ball 170 as described herein and as depicted in FIG. 10 with two concentric components that comprise the inner surface 121 of the seat 120;

Configuration C: the downhole tool 50A and a ball 170 as described herein and as depicted in FIG. 3, wherein at least the seat 120, 120A is made from 65-45-12 ductile iron; and Configuration D: a similar downhole tool 50A as in Configuration C except wherein at least a portion of the seat 120, 120A is made from a degradable metal

TABLE 2

Summarizes the results of the laboratory pressure tests.

| Seat Type | Material | Seat Size (in) | Ball Type | Ball Size (in) | Maximum Observed Failure Pressure (psi) |
|---|---|---|---|---|---|
| Industry Standard | 65-45-12 Ductile Iron | 3.510 | A degradable magnesium alloy | 3.5625 | 4482 |
| IWC Two Piece | 65-45-12 Ductile Iron | 3.510 | A degradable magnesium alloy | 3.5625 | 11212 |
| IWC One Piece | 65-45-12 Ductile Iron | 3.510 | A degradable magnesium alloy | 3.5625 | 10348 |
| IWC One Piece | A degradable magnesium alloy | 3.510 | A degradable magnesium alloy | 3.5625 | 6034 |

We claim:

1. A downhole tool that is connectible to a string of tubulars for positioning within a well, the downhole tool comprising:

(a) an outer housing that comprises an uphole end, a downhole end and an inner surface defined therebetween, each end is connectible to the string of tubulars, wherein the inner surface defines an interior space with a first inner-diameter and the inner surface also defines a recess with a second inner-diameter that is larger than the first inner-diameter;

(b) a sleeve that is positionable within the recess, the sleeve comprising an uphole end, a downhole end and a ramp defined therebetween that extends substantially the length of the sleeve, wherein the sleeve has a larger inner diameter towards the uphole end than the downhole end; and (c) a seat that is slidably positionable within the sleeve along the ramp, the seat defines at least one plateau section that is configured to receive and engage an equatorial portion of an actuator when the actuator is received by the seat.

2. The downhole tool of claim 1, wherein the ramp has a substantially constant slope.

3. The downhole tool of claim 1, wherein the sleeve defines a shoulder that is positioned at the downhole end of the ramp for stopping the seat.

4. The downhole tool of claim 1, wherein the seat defines a second plateau section that is adjoined to the first plateau section by an angled edge and wherein the angled edge is configured to reduce a fluid pressure drop therethrough.

5. The downhole tool of claim 1, further comprising a retainer ring for retaining the seat against a force that urges the seat towards the surface.

6. The downhole tool of claim 1, wherein the seat is configured to provide support for a downhole portion of the actuator when the actuator is engaged by the seat, wherein the downhole portion of the actuator is positioned downhole from the equatorial portion of the actuator.

7. The downhole tool of claim 1, wherein when the seat slides along the ramp towards the downhole end of the sleeve, the seat is compressed.

8. The downhole tool of claim 7, wherein when the seat is compressed and the actuator is engaged therein, the seat radially compresses at least a portion of the equatorial portion of the actuator.

9. The downhole tool of claim 1, wherein at least a portion of the seat is made of one or more degradable materials.

10. The downhole of claim 9, wherein at least a portion of the seat is protected by a coating and wherein the coating is configured to be removable.

11. The downhole tool of claim 1, further comprising the actuator and wherein at least a portion of the actuator is made of one or more degradable materials.

12. The downhole tool of claim 11, wherein at least a portion of the actuator is protected by a coating and wherein the coating is configured to be removable.

13. A method of treating a geological formation, the method comprising steps of:

(a) positioning a downhole tool within a well that extends into the geological formation, wherein the downhole tool comprises an outer sleeve and a seat that is slidable therein;

(b) engaging an equatorial portion of an actuator with the seat;

(c) sliding the seat in a downhole direction;

(d) compressing the equatorial portion of the actuator to a first compressed position;

(e) sliding the seat further in the downhole direction; and (f) compressing the equatorial portion of the actuator to a second compressed position, wherein sliding the seat in the downhole direction establishes fluid communication between an internal space of the downhole tool and the geological formation, and wherein the equatorial portion of the actuator is compressed greater in the second compressed position than in the first compressed position.

14. The method of claim 13, further comprising a step of degrading the actuator.

15. The method of claim 13, further comprising a step of degrading at least a portion of the seat.

16. The method of claim 13, further comprising a step of conducting a backflow operation for disengaging the actuator from the seat.

17. The method of claim 16, further comprising a step of retaining the seat within the downhole tool.

18. The method of claim 13, wherein the step of introducing the actuator comprises a step of applying a hydraulic pressure upon the actuator of between about 1 pounds per square inch (psi) and about 3000 psi.

19. The method of claim 13, wherein the step of sliding the seat in the downhole direction comprises a step of applying a hydraulic pressure upon the actuator of between about 500 psi and about 5000 psi.

20. The method of claim 13, further comprising a step of further compressing the equatorial portion of the actuator by applying a hydraulic pressure upon the actuator of between 500 psi about 15,000 psi.

* * * * *